United States Patent
Byagowi (10) Patent No.: US 11,381,375 B1
(45) Date of Patent: Jul. 5, 2022

(54) ADAPTIVE CORRECTION OF NETWORK DEVICE CLOCK TIMING ERRORS

(71) Applicant: Meta Platforms, Inc., Menlo Park, CA (US)

(72) Inventor: Ahmad Byagowi, Milpitas, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/014,775

(22) Filed: Sep. 8, 2020

(51) Int. Cl.
| | | |
|---|---|---|
| *H04L 7/00* | (2006.01) | |
| *G06F 13/38* | (2006.01) | |
| *H04W 56/00* | (2009.01) | |

(52) U.S. Cl.
CPC .......... *H04L 7/0008* (2013.01); *G06F 13/382* (2013.01); *H04L 7/0016* (2013.01); *H04W 56/004* (2013.01); *G06F 2213/3808* (2013.01)

(58) Field of Classification Search
CPC ... H04W 56/00; H04W 56/002; H04J 3/0667; H04J 3/0664; H04J 3/0632
See application file for complete search history.

(56) References Cited

U.S. PATENT DOCUMENTS

| | | | | |
|---|---|---|---|---|
| 10,320,508 | B2 * | 6/2019 | Shimizu | H04J 3/0644 |
| 2016/0223677 | A1 * | 8/2016 | Trevino | H04K 3/90 |
| 2020/0145704 | A1 * | 5/2020 | Chu | H04N 21/6543 |

* cited by examiner

*Primary Examiner* — Jamal Javaid
(74) *Attorney, Agent, or Firm* — Van Pelt, Yi & James LLP (57) ABSTRACT

A first timing error of a network device is determined based at least in part on a first received network message from a timing synchronization source. At a first instance, it is determined whether the first timing error exceeds a threshold. In response to a determination at the first instance that the first timing error exceeds the threshold, a clock of the network device is corrected based at least in part on the first received network message. A second timing error of the network device is determined based at least in part on a second received network message from the timing synchronization source. At a second instance, it is determined whether the second timing error exceeds the threshold. In response to a determination at the second instance that the second timing error does not exceed the threshold, the clock of the network device is allowed to function without correction.

20 Claims, 9 Drawing Sheets

ADAPTIVE CORRECTION OF NETWORK DEVICE CLOCK TIMING ERRORS

BACKGROUND OF THE INVENTION

A network interface controller (NIC) is a computer hardware component that connects a computer to a computer network. NICs may also be referred to as network interface cards, network adapters, local area network (LAN) adapters, physical network interfaces, or other similar terms. NICs implement the electronic circuitry needed to communicate among computers in a network (e.g., a LAN). Computers in a network can be synchronized by synchronizing the NICs of the computers. Synchronization may be required to synchronize financial transactions, mobile phone tower transmissions, and other operations in networks that require precise timing. Various synchronization protocols can be used. It would be beneficial to develop techniques directed toward better characterization of timing errors and other parameters associated with computer network synchronization as well as techniques directed toward improved performance of computer network synchronization.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic correction of network device clock timing errors is disclosed. A first timing error of a network device is determined based at least in part on a first received network message from a timing synchronization source. At a first instance, it is determined whether the first timing error exceeds a threshold. In response to a determination at the first instance that the first timing error exceeds the threshold, clock of the network device is corrected based at least in part on the first received network message. A second timing error of the network device is determined based at least in part on a second received network message from the timing synchronization source. At a second instance, it is determined whether the second timing error exceeds the threshold. In response to a determination at the second instance that the second timing error does not exceed the threshold, the clock of the network device is allowed to function without correction.

Network time protocol (NTP) and precision time protocol (PTP) are commonly used protocols to synchronize clocks throughout a computer network. PTP, due to its higher accuracy, is more suitable for applications that require high precision. NTP, though, is typically easier to implement and may be more appropriate for applications that do not require the precision of PTP. Global Positioning System (GPS) time can also be obtained directly, but this can be prohibitively expensive. PTP has been published as the IEEE-1588 standard. In various scenarios, PTP is implemented as a packet-based synchronization protocol using Ethernet connections. PTP's increased accuracy (compared to NTP) is a result of hardware time stamping and a servo mechanism to continuously reduce timing error. PTP utilizes hardware timestamping that accounts for device latency (e.g., amount of time synchronization messages stay in a device).

A practical and technological benefit of the techniques disclosed herein is improved ability to evaluate and analyze timing errors of network (clock) devices. For example, with respect to the servo mechanism used with PTP, instead of maximizing update sessions in the servo mechanism as is currently done, using the techniques disclosed herein, the update sessions to perform clock correction are dynamic. For example, they can be threshold-based so that clock correction is performed as needed. The techniques disclosed herein allow for monitoring of accuracy of hardware clock oscillators so that update sessions can be performed as necessary to keep accuracy within specified requirements. Thus, by not performing clock correction more than what is needed, accuracy degradation of hardware clock oscillators (e.g., due to aging and other physical factors) can be observed. Another advantage of not performing clock correction more than what is needed is that network bandwidth can be conserved and oscillator short-term stability is improved.

Figure 1:
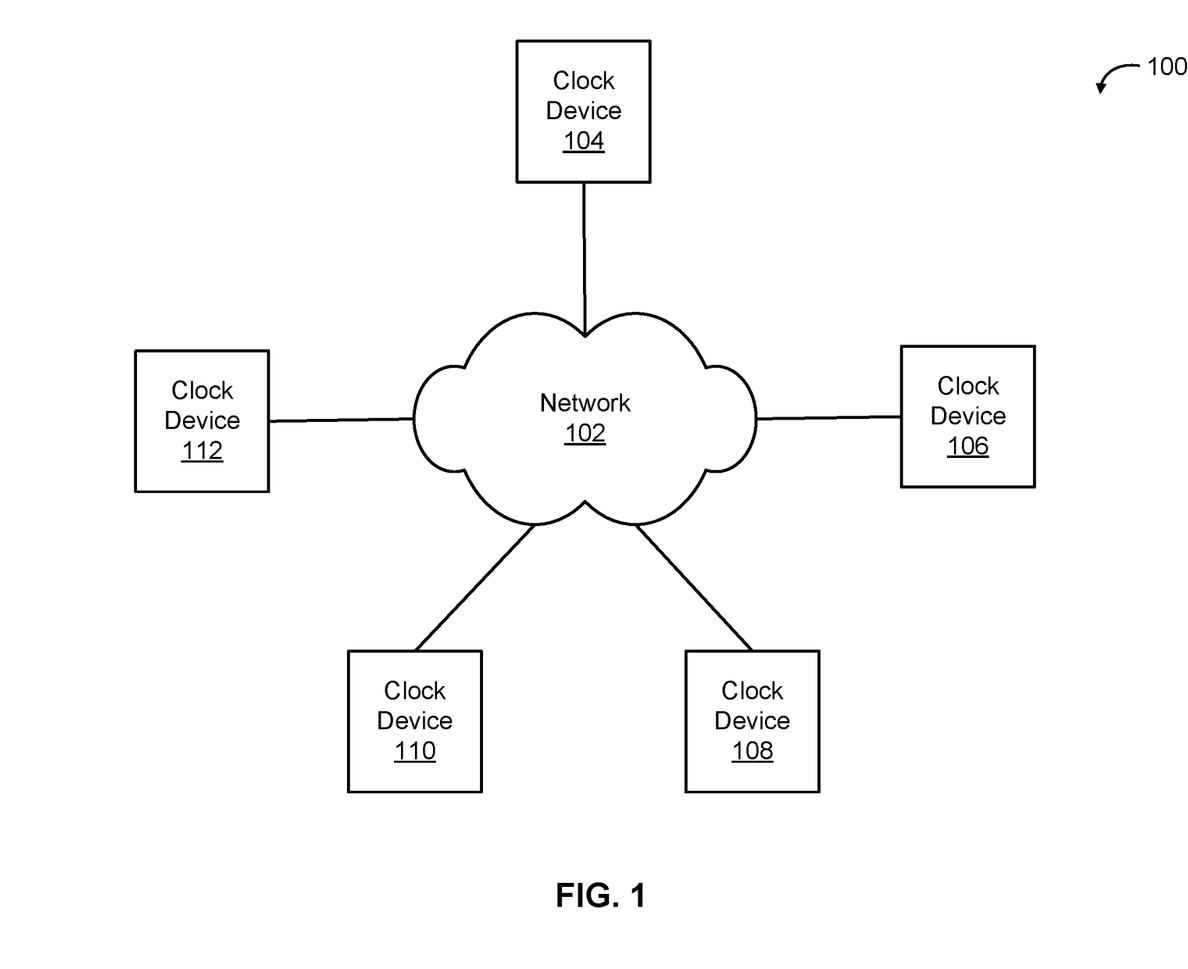
FIG. 1 is a diagram illustrating an embodiment of a network of clock devices.

FIG. 1 is a diagram illustrating an embodiment of a network of clock devices. As used herein, clock devices may also be referred to as network clocks, network device clocks, clocks, etc. Timing errors of clock devices may be referred to as timing errors of network devices, timing errors of clocks, timing errors of network device clocks, timing errors of network clocks, etc. In system 100, clock devices 104, 106, 108, 110, and 112 are communicatively connected to one another through network 102. The number of clock devices shown is merely illustrative. It is possible for there to be fewer or more clock devices in system 100. In some embodiments, network 102 is a LAN. Other examples of network 102 include one or more of the following: a direct or indirect physical communication connection, mobile communication network, Internet, intranet, Wide Area Network, Storage Area Network, and any other form of connecting two or more systems, components, or storage devices together. In some embodiments, the clock devices are NICs. For example, physical hardware clocks (PHCs) located on NICs can be utilized to keep time. In various embodiments, the NICs are parts of computers connected to network 102. In various embodiments, each PHC generates internal hardware clock values corresponding to the time kept by the PHC. In various embodiments, the PHC is an integrated circuit clock, such as a silicon-based or quartz crystal-based oscillator. Hardware clock oscillators (e.g., silicon-based or quartz crystal-based) oftentimes degrade as a function of time (e.g., due to temperature effects, mechanical damage, radiation damage, damage to packaging/connector materials, natural aging, and other effects). In some embodiments, PHCs utilize 80-bit counters (80 binary digits), of which 48 bits measure sub-second time.

In various embodiments, the clocks in system 100 exhibit timing errors that are remedied with a network synchronization protocol such as NTP, PTP, or another protocol. In some embodiments, one of the clocks serves as a master clock against which other clocks are synchronized. This master clock may be referred to as a grandmaster, time provider, or another similar term. The grandmaster is oftentimes a clock that is of higher quality and is more accurate than the other clocks, such as an atomic clock. The grandmaster may be selected based on a master clock selection algorithm (e.g., best master clock algorithm). Clocks other than the grandmaster can be ordinary clocks (non-grandmaster clocks with a single network connection, also referred to as slaves), boundary clocks (clocks with multiple network connections that can synchronize one network segment to another), or transparent clocks (clocks that modify messages passing through and can measure and adjust for network delays).

Figure 2:
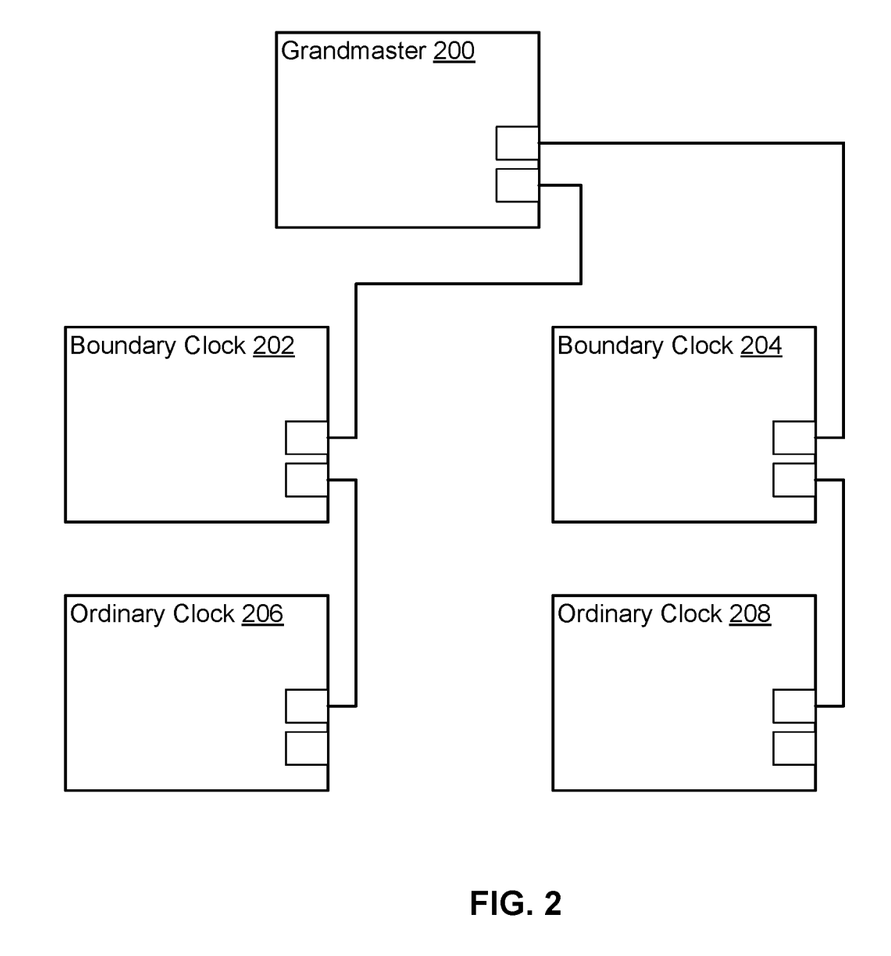
FIG. 2 is a diagram illustrating a first example topology for a network of clock devices.
Figure 3:
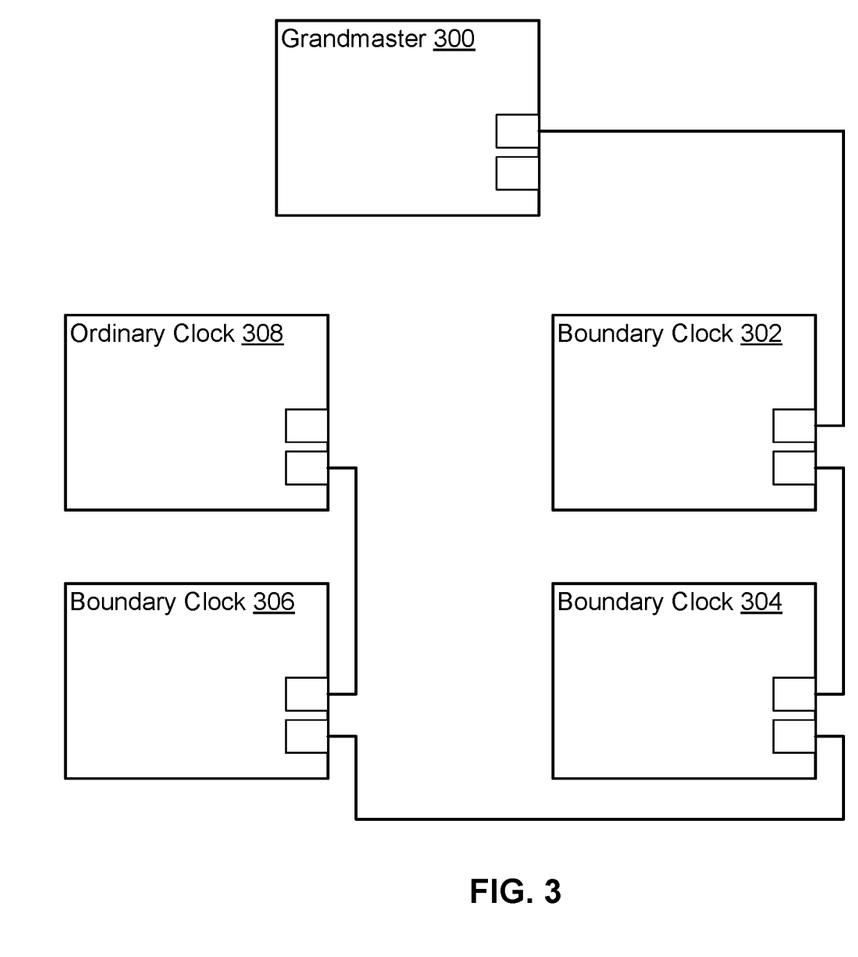
FIG. 3 is a diagram illustrating a second example topology for a network of clock devices.

The clock devices in system 100 may be communicatively connected in a variety of different topologies. The types of clock devices in system 100 may also vary. Timing errors can vary depending on the specific topology and types of devices. The performance of a network synchronization protocol (e.g., how long synchronization takes to complete) can also vary depending on the specific topology and types of devices. FIGS. 2 and 3 illustrate example topologies for a network with one grandmaster and four other clock devices.

FIG. 2 is a diagram illustrating a first example topology for a network of clock devices. In the example shown, grandmaster 200 is communicatively connected to boundary clock 202 and boundary clock 204. In the example shown, boundary clocks 202 and 204 comprise a boundary stage that has connections to both a grandmaster stage and an ordinary clock stage. Boundary clocks 202 and 204 synchronize from one network segment (grandmaster stage) to another (ordinary clock stage). In the example shown, ordinary clock 206 and ordinary clock 208 comprise a last stage of a hierarchy. In various embodiments, grandmaster 200 includes or is communicatively connected to a clock that is able to keep time more precisely than typical clocks (e.g., an atomic clock). It is also possible to receive high precision time from a GPS source.

FIG. 3 is a diagram illustrating a second example topology for a network of clock devices. As with the topology shown in FIG. 2, there is one grandmaster (grandmaster 300 in this example). In various embodiments, grandmaster 300 includes or is communicatively connected to a clock that is able to keep time more precisely than typical clocks. In contrast to the topology shown in FIG. 2, there are multiple boundary stages (boundary clocks 302, 304, and 306 connected serially) connecting a grandmaster stage (grandmaster 300) to an ordinary clock stage (ordinary clock 308). Synchronizing through various stages in a hierarchy of clocks results in timing error variances across the various stages. In many scenarios, timing errors increase in stages further from the grandmaster stage.

Figure 4:
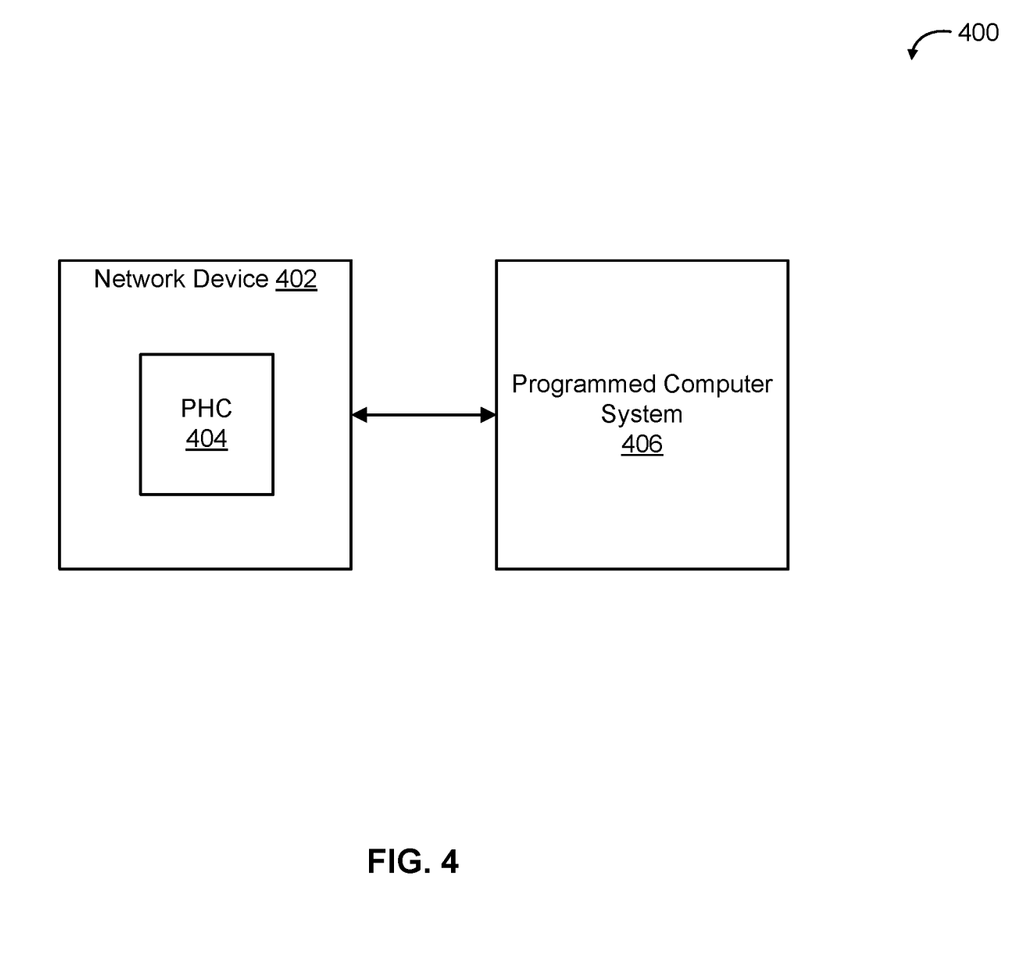
FIG. 4 is a block diagram illustrating an embodiment of a system for dynamically correcting timing errors of a clock device.

FIG. 4 is a block diagram illustrating an embodiment of a system for dynamically correcting timing errors of a clock device. In the example shown, system 400 includes network device 402 and programmed computer system 406. In some embodiments, network device 402 is one of the clock devices from system 100 of FIG. 1. In some embodiments, programmed computer system 406 is computer system 700 of FIG. 7. In various embodiments, network device 402 is communicatively connected to a network (e.g., network 102 of FIG. 1). In various embodiments, network device 402 synchronizes its time with a timing synchronization source (e.g., a grandmaster) over a network. For example, a timing error of network device 402 can be determined based on PTP messages received over a network (e.g., see FIG. 8) and the timing error corrected using a servo mechanism (e.g., see FIG. 5). In various embodiments, the servo mechanism is controlled in software by programmed computer system 406.

In the example illustrated, network device 402 includes PHC 404. For example, PHC 404 may be an ordinary clock or boundary clock of FIG. 2 or FIG. 3. In various embodiments, PHC 404 includes an oscillator (e.g., silicon-based or quartz crystal-based) that may degrade (e.g., exhibit frequency fluctuations) over time (e.g., due to temperature effects, mechanical damage, radiation damage, damage to packaging/connector materials, natural aging, and other dependencies). Time values of PHC 404 can be incorrect with respect to the timing synchronization source and thus need to be corrected. In various embodiments, PHC 404 produces hardware timestamps that are utilized (e.g., in a PTP protocol) to correct a timing error. In the example illustrated, network device 402 and PHC 404 are shown as separate from programmed computer system 406. This is merely illustrative and not restrictive. It is also possible for network device 402 and PHC 404 to be incorporated into (be a part of) programmed computer system 406.

Figure 5:
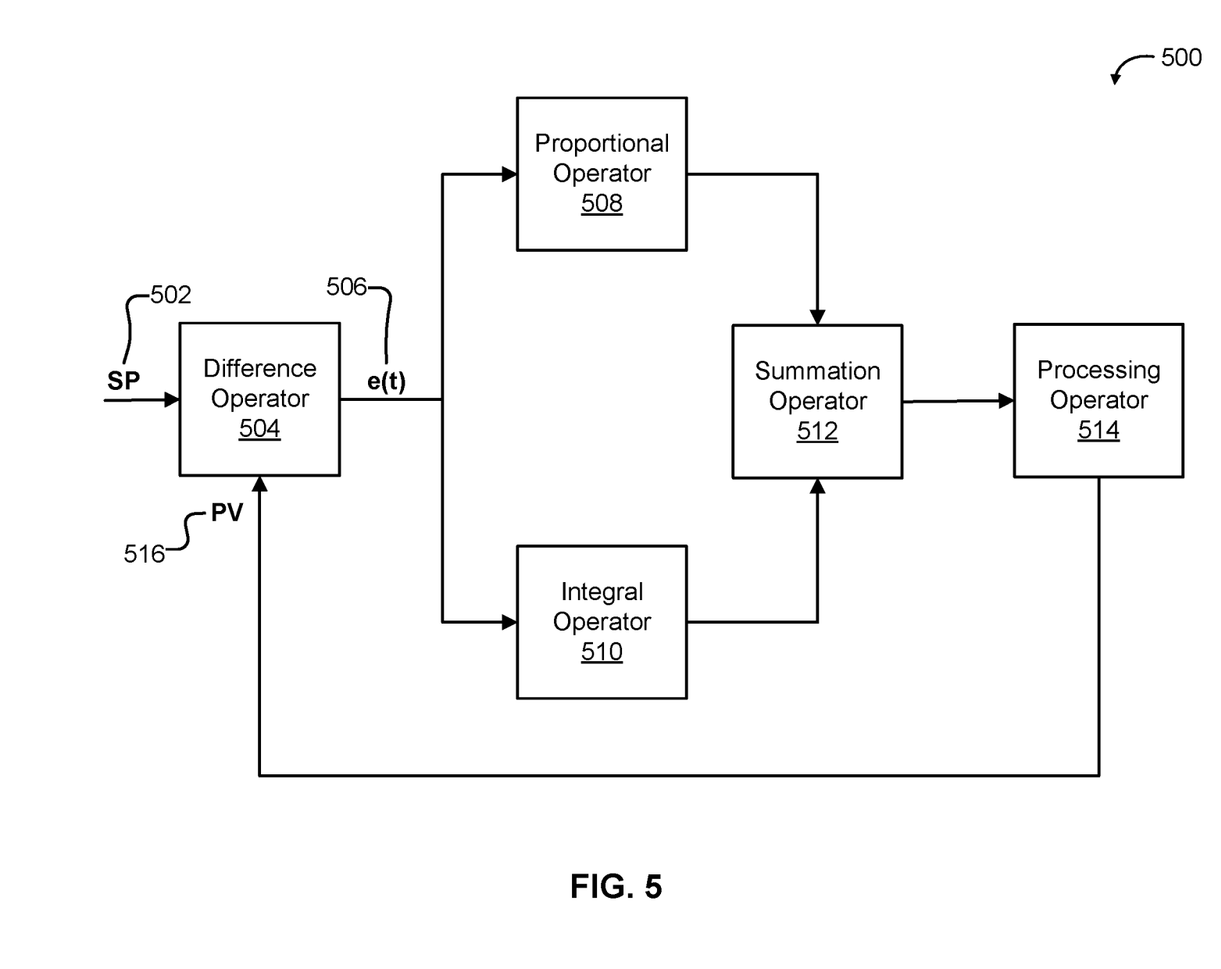
FIG. 5 is a diagram illustrating an example servo mechanism for correcting timing errors.

FIG. 5 is a diagram illustrating an example servo mechanism for correcting timing errors. In some embodiments, servo mechanism 500 is utilized to correct timing errors of network device 402 of FIG. 4. In some embodiments, servo mechanism 500 is utilized to correct the timing error in 602 of FIG. 6. In some embodiments, servo mechanism 500 is performed in software. For example, servo mechanism 500 may be implemented as computer code running on programmed computer system 406 of FIG. 4.

In the example illustrated, servo mechanism 500 operates on SP (setpoint) 502 and PV (process variable) 516. In various embodiments, SP 502 corresponds to a timing synchronization source (e.g., grandmaster clock) time that is regarded as a correct time. In some embodiments, SP 502 is calculated based on various timestamps associated with received/transmitted network messages (e.g., see FIG. 8). In various embodiments, SP 502 is determined based at least in part on one or more messages from the timing synchronization source received via a network (e.g., network 102 of FIG. 1). In various embodiments, PV 516 corresponds to a secondary clock time (e.g., of PHC 404 of FIG. 4) that needs to be corrected. In the example illustrated, difference operator 504 takes SP 502 and PV 516 as inputs, determines the difference between the inputs (e.g., the difference between the time of a grandmaster clock and a secondary clock), and outputs the difference as e(t) 506. In the example shown, the difference between SP 502 and PV 516 is referred to as an error e(t) (e.g., e(t)=PV−SP).

In the example illustrated, e(t) 506 is received by proportional operator 508 and integral operator 510. In various embodiments, proportional operator 508 multiples e(t) 506 by a gain factor $K_P$. For example, the output of proportional operator 508 can be written as $P=K_P*e(t)$. In various embodiments, integral operator 510 accounts for past values of e(t) and integrates them over time. For example, the output of integral operator 510 can be written as $I=K_I\int e(\tau)d\tau$. $K_I$ is a gain factor. Integral operator 510 adds a control effect based on the historic cumulative value of the error e(t). The relative effects of proportional operator 508 and integral operator 510 are controlled by the gain factors $K_P$ and $K_I$, respectively. In the example illustrated, summation operator 512 sums P and I. This sum is acted upon by processing operator 514. Processing operator 514 performs an action that alters the value of PV 516. For example, with respect to PV 516 being a secondary clock time, in some embodiments, processing operator 514 transmits a command to clock hardware that slows down or speeds up a PHC associated with PV 516. The PHC can be slowed down or sped up by decreasing or increasing an oscillation frequency, respectively, of an oscillator of the PHC. In order to decrease the error e(t) 506, the PHC would be slowed down if PV 516 is greater than SP 502 (secondary clock time ahead of grandmaster time) and sped up if PV 516 is less than SP 502 (secondary clock time behind grandmaster time). It is also possible to directly set the PHC to a specific clock value or step the PHC to change its clock value. In some scenarios, setting or stepping the PHC may not be desirable because clock values may be set/stepped such that past events appear as having occurred in the future.

The example illustrated is an example of a proportional integral control loop. It is also possible for servo mechanism 500 to include a derivative operator (e.g., a derivative of e(t) multiplied by a gain factor) whose output is also included as an input to summation operator 512, in which case servo mechanism 500 would be an example of a proportional integral derivative control loop. Servo mechanism 500 is an example of a feedback control loop because the output of the processing steps is fed back as an input. Stated alternatively, PV 516 is both an output and an input of servo mechanism 500. Servo mechanism 500 acts to reduce e(t) over successive iterations of processing until e(t) converges to zero or some other specified value. Stated alternatively, servo mechanism 500 acts on PV 516 until it converges (equals) SP 502 or is within a specified range of SP 502.

Figure 6:
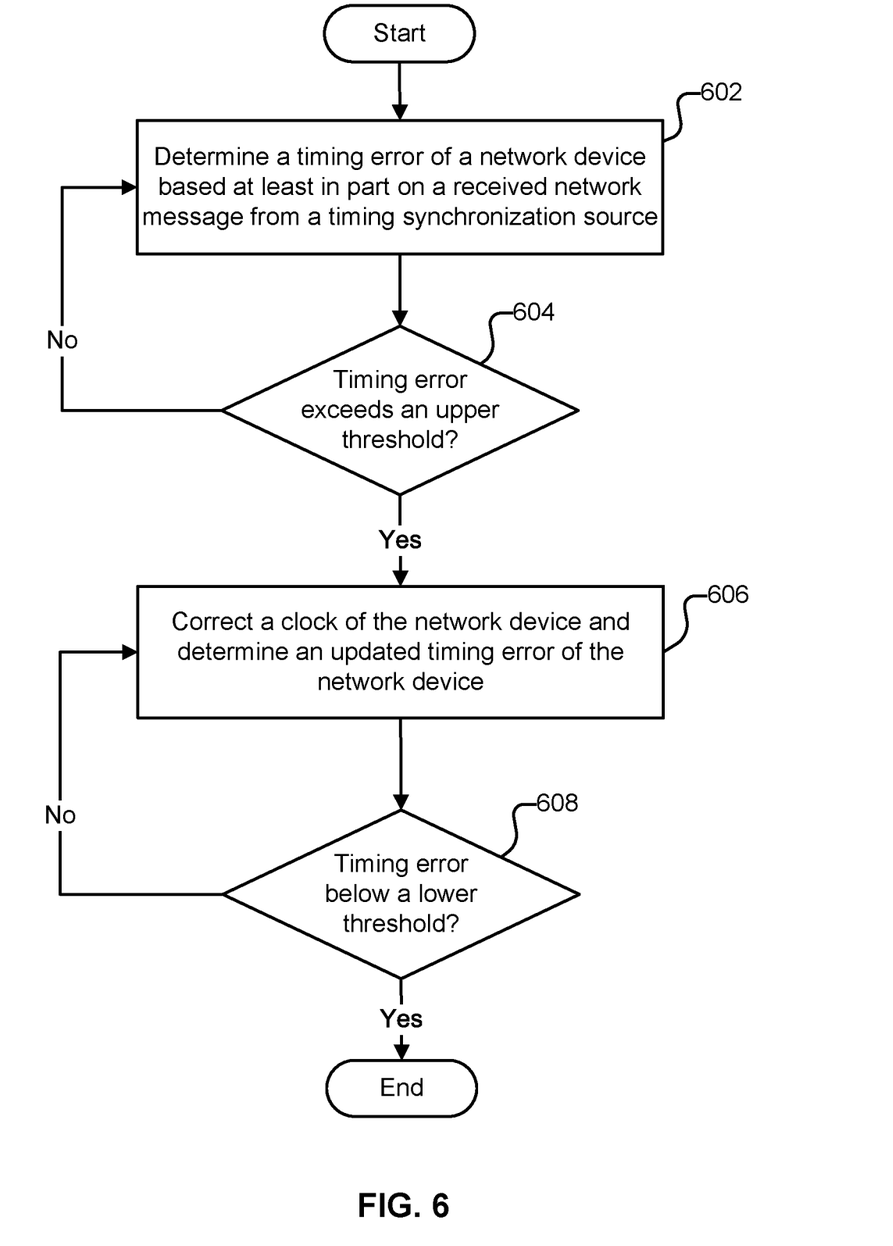
FIG. 6 is a flow chart illustrating an embodiment of a process for dynamically correcting timing errors of a clock device.

FIG. 6 is a flow chart illustrating an embodiment of a process for dynamically correcting timing errors of a clock device. In some embodiments, the process of FIG. 6 is performed by system 400 of FIG. 4.

At 602, a timing error of a network device is determined based at least in part on a received network message from a timing synchronization source. In some embodiments, the network device is network device 402 of FIG. 4. In some embodiments, the timing error is an inaccurate clock time of PHC 404 of FIG. 4 with respect to a more accurate clock (e.g., a clock of another network device to which network device 402 of FIG. 4 is communicatively connected). In some embodiments, the timing synchronization source is a grandmaster clock of another network device to which the network device is communicatively connected (e.g., via network 102 of FIG. 1). It is also possible for the timing synchronization source to be a boundary clock depending on the specific hierarchical connection scheme between the network device and other network devices. The timing synchronization source is another network device that keeps more accurate (or deemed to be more accurate) time. The timing synchronization source is situated one layer above the network device in a specified hierarchy, meaning the timing synchronization source could be a network device with a grandmaster clock or a boundary clock when the network device has an ordinary clock (e.g., see FIGS. 2 and 3). In some embodiments, the received network message includes one or more timestamps associated with a network synchronization protocol (e.g., PTP). The timestamps are utilized to determine a clock value of a more accurate clock of another network device to which the network device is communicatively connected. The clock value of the more accurate clock can be utilized to determine an error (e.g., e(t) 505 of FIG. 5) of a clock value of the network device.

At 604, it is determined whether the timing error exceeds an upper threshold. In various embodiments, the timing error is the difference in time between a secondary clock and a grandmaster clock. In various embodiments, the upper threshold is a specified value corresponding to a cutoff point at which correction of the timing error is initiated. For example, for an upper threshold of 50 nanoseconds (ns) that a user has specified (e.g., via programmed computer system 406 of FIG. 4), correction of the timing error would be initiated if it is determined that the timing error exceeds 50 ns. If at 604 it is determined that the timing error exceeds the upper threshold, at 606, correction of the timing error is initiated. If at 604 it is determined that the timing error does not exceed the upper threshold, at 602, the timing error is determined again (e.g., after a specified period of time, such as 1 second), after which the timing error is compared again against the upper threshold.

At 606, a clock of the network device is corrected and an updated timing error of the network device is determined. In some embodiments, servo mechanism 500 of FIG. 5 is utilized to correct the clock. An advantage of the approach illustrated is that fewer clock correction sessions are needed because instead of correcting the clock according to a fixed rate, clock correction is performed as needed to keep the timing error within an error bound (below the upper threshold). A consequence and benefit of correcting the clock as needed is that it is possible to observe and determine how long it takes for the timing error to deviate (e.g., reach the upper threshold) before correction is needed again. This provides a quantitative characterization of a PHC. The PHC can be characterized over time to observe oscillator drift over time (e.g., due to aging, temperature effects, damage/degradation, and other effects). Furthermore, network bandwidth can be conserved if the interval at which the network messages are trafficked at 602 can be lengthened. In some embodiments, firmware or an application-specific integrated circuit (ASIC) associated with the network device (e.g., a NIC) is configured to control the rate at which timing errors of the network device are determined at 602. For example, the NIC can be configured to intermittently turn off a network synchronization protocol (e.g., PTP) in order to conserve network bandwidth. In various embodiments, the mechanism for clock correction (e.g., servo mechanism 500 of FIG. 5) requires no hardware modification because it is implemented in software. In various embodiments, the updated timing error of the network device is determined according to the same mechanism as in 602 for initially determining the timing error of the network device.

In various embodiments, the times at which the clock of the network device is corrected are stored. For example, the times can be stored in memory associated with programmed computer system 406 of FIG. 4. Based on the stored times, in various embodiments, the lengths of time intervals between corrections of the clock of the network device are calculated. Monitoring the amounts of time between corrections provides quantitative information about the stability of the clock of the network device. A further benefit of correcting the clock of the network device adaptively (as needed) instead of at a fixed rate is that short term stability of the clock of the network device is improved (due to not needing to constantly correct the clock, which can cause short term fluctuations). This avoids overutilizing resources associated with the clock of the network device from performing constant corrections.

At 608, it is determined whether the (updated) timing error is below a lower threshold. In various embodiments, the lower threshold is a specified value corresponding to a cutoff point at which correction of the timing error is terminated. For example, for a lower threshold of 5 ns that a user has specified (e.g., via programmed computer system 406 of FIG. 4), correction of the timing error would end if it is determined that the timing error is below 5 ns. If at 608 it is determined that the timing error is below the lower threshold, correction of the timing error ends. If at 608 it is determined that the timing error is not below the lower threshold, at 606, correction of the timing error continues (e.g., another iteration of servo mechanism 500 of FIG. 5 is performed), after which the timing error is compared again against the lower threshold. Thus, the process of FIG. 6 maintains the timing error within an error bound specified by the upper threshold and lower threshold.

Figure 7:
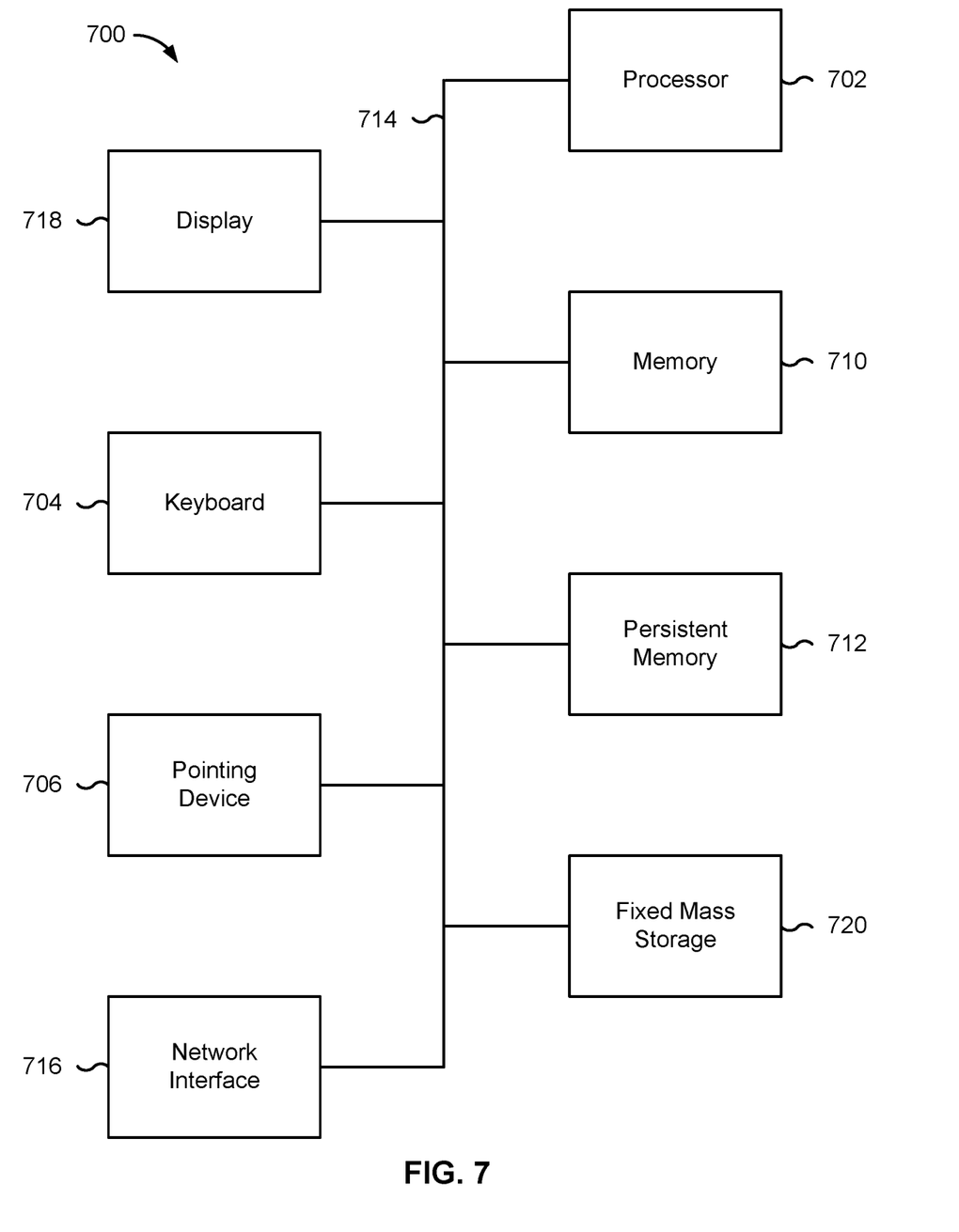
FIG. 7 is a functional diagram illustrating a programmed computer system.

FIG. 7 is a functional diagram illustrating a programmed computer system. In some embodiments, the programmed computer system is programmed computer system 406 of FIG. 4.

In the example shown, computer system 700 includes various subsystems as described below. Computer system 700 includes at least one microprocessor subsystem (also referred to as a processor or a central processing unit (CPU)) 702. For example, processor 702 can be implemented by a single-chip processor or by multiple processors. In some embodiments, processor 702 is a general-purpose digital processor that controls the operation of computer system 700. Using instructions retrieved from memory 710, processor 702 controls the reception and manipulation of input data, and the output and display of data on output devices (e.g., display 718).

Processor 702 is coupled bi-directionally with memory 710, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also, as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

Persistent memory 712 (e.g., a removable mass storage device) provides additional data storage capacity for computer system 700, and is coupled either bi-directionally (read/write) or uni-directionally (read only) to processor 702. For example, persistent memory 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of fixed mass storage 720 is a hard disk drive. Persistent memory 712 and fixed mass storage 720 generally store additional programming instructions, data, and the like that typically are not in active use by the processor 702. It will be appreciated that the information retained within persistent memory 712 and fixed mass storages 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, pointing device 706 can be a mouse, stylus, track ball, or tablet, and is useful for interacting with a graphical user interface.

Network interface 716 allows processor 702 to be coupled to another computer, computer network, or telecommunications network using a network connection as shown. For example, through network interface 716, processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect computer system 700 to an external network and transfer data according to standard protocols. Processes can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Figure 8:
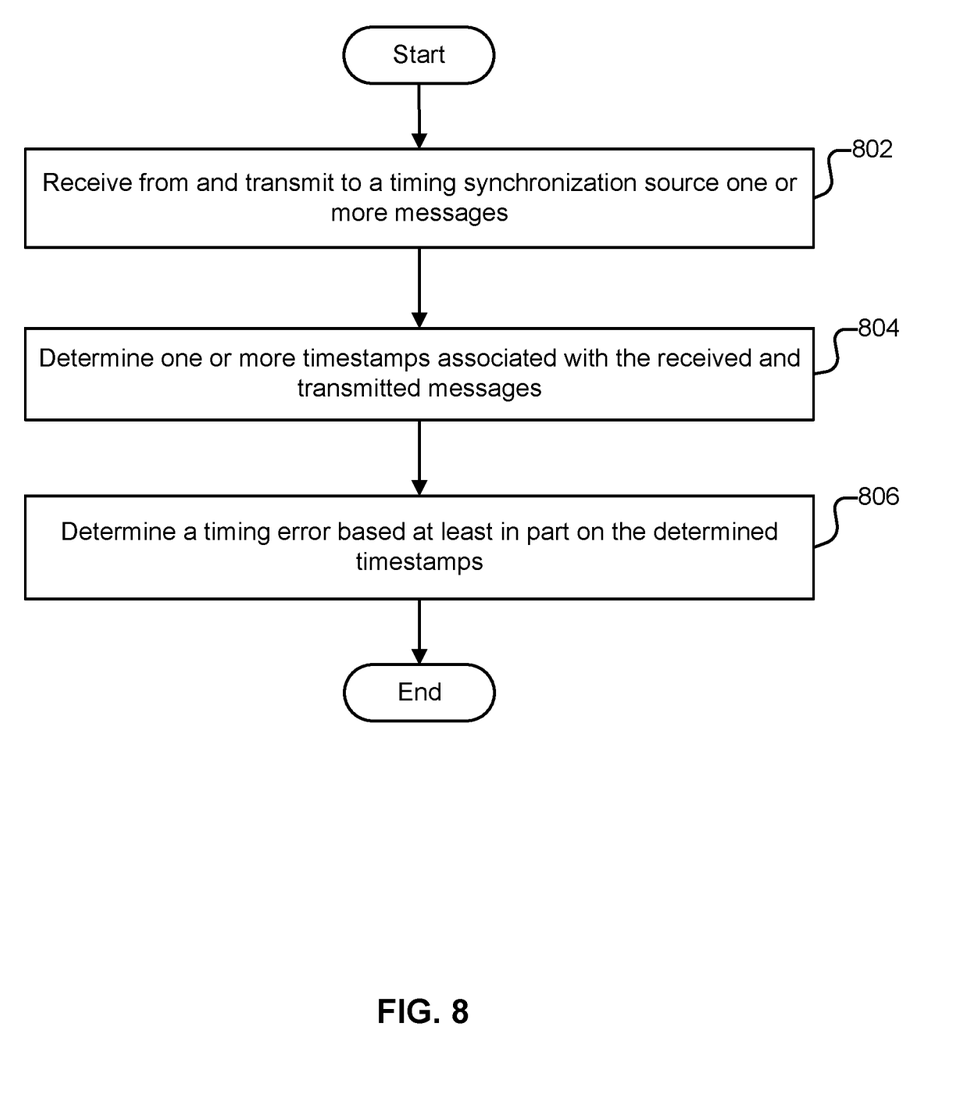
FIG. 8 is a flow chart illustrating an embodiment of a process for determining a timing error of a network device.

FIG. 8 is a flow chart illustrating an embodiment of a process for determining a timing error of a network device. In some embodiments, the network device is associated with a clock that is to be synchronized with a more accurate clock. In some embodiments, the process of FIG. 8 is performed by system 400 of FIG. 4. In some embodiments, at least a portion of the process of FIG. 8 is performed in 602 of FIG. 6.

At 802, one or more messages are received from and transmitted to a timing synchronization source. The timing error of the network device is the offset of the time of the network device with respect to the time of the timing synchronization source. The specific messages received by the network device from the timing synchronization source and sent by the network to the timing synchronization source depends on the specific protocol utilized to determine the timing error. For example, with PTP, typically, a sequence of four messages transit between the network device (also referred to as a slave) and the timing synchronization source (also referred to as a master). Specifically, in some embodiments, an initial message is sent from master to slave, a follow-up message is sent from the master to the slave, a delay request message is sent from the slave to the master, and a final delay response message is sent from the master to the slave.

At 804, one or more timestamps associated with the received and transmitted messages are determined. In various embodiments, the timestamps are produced at various points in time associated with step 802. The process of FIG. 8 is illustrative. It is not necessarily the case that all parts of step 802 are completed before step 804 occurs, and vice versa. For the PTP sequence of messages described above, in various embodiments, four PTP timestamps are produced, when the master sends the initial message (t1), when the slave receives the initial message (t2), when the slave sends the delay request message (t3), and when the master receives the delay request message (t4). In some embodiments, the master sends the t1 value to the slave in the follow-up message and sends the t4 value to the slave in the final delay response message. The t2 and t3 values are produced by the slave, so after the slave receives the final delay response message, the slave has access to all the timestamps and can use the timestamps to calculate a timing latency between the master and the slave in both directions. PTP devices have hardware fetch timestamps (e.g., from PHCs), which allow PTP devices to suffer from less device latency. Devices running NTP have extra device latency because of local operating system delays associated with producing software timestamps.

At 806, a timing error is determined based at least in part on the determined timestamps. For the PTP timestamps described above, a master-to-slave transit delay (delay1) is calculated as delay1=t2−t1 and a slave-to-master transit delay (delay2) is calculated as delay2=t4−t3. An average delay (delay3) is calculated as delay3=(delay1+delay2)/2. In some embodiments, the timing error (timing offset) between the master (timing synchronization source) and the slave (the network device) is calculated as offset=delay1−delay3. In a network environment that supports IEEE-1588, packet delay variation is not significant and the above time offset is oftentimes very close to the actual timing error between the timing synchronization source and the network device. In some embodiments, packet delay variation is corrected by measuring residence time for PTP messages as they pass through devices. The time of the network device is known locally, and this corresponds to PV 516 of FIG. 5. SP 502 of FIG. 5 can be determined by adding (or subtracting) the calculated timing offset to the local time of the network device.

The above illustrates an example of determining the timing error of the network device by utilizing PTP messages and timestamps. This example is merely illustrative. It is also possible to determine the timing error by utilizing messages and timestamps associated with different synchronization protocols. For example, NTP request/reply packet exchanges may be utilized. The slave can store origination timestamps when sending out requests and the master can store receipt timestamps when receiving packets. As with PTP, timestamps are returned from the master to the slave and travel time offsets can be calculated.

Figure 9:
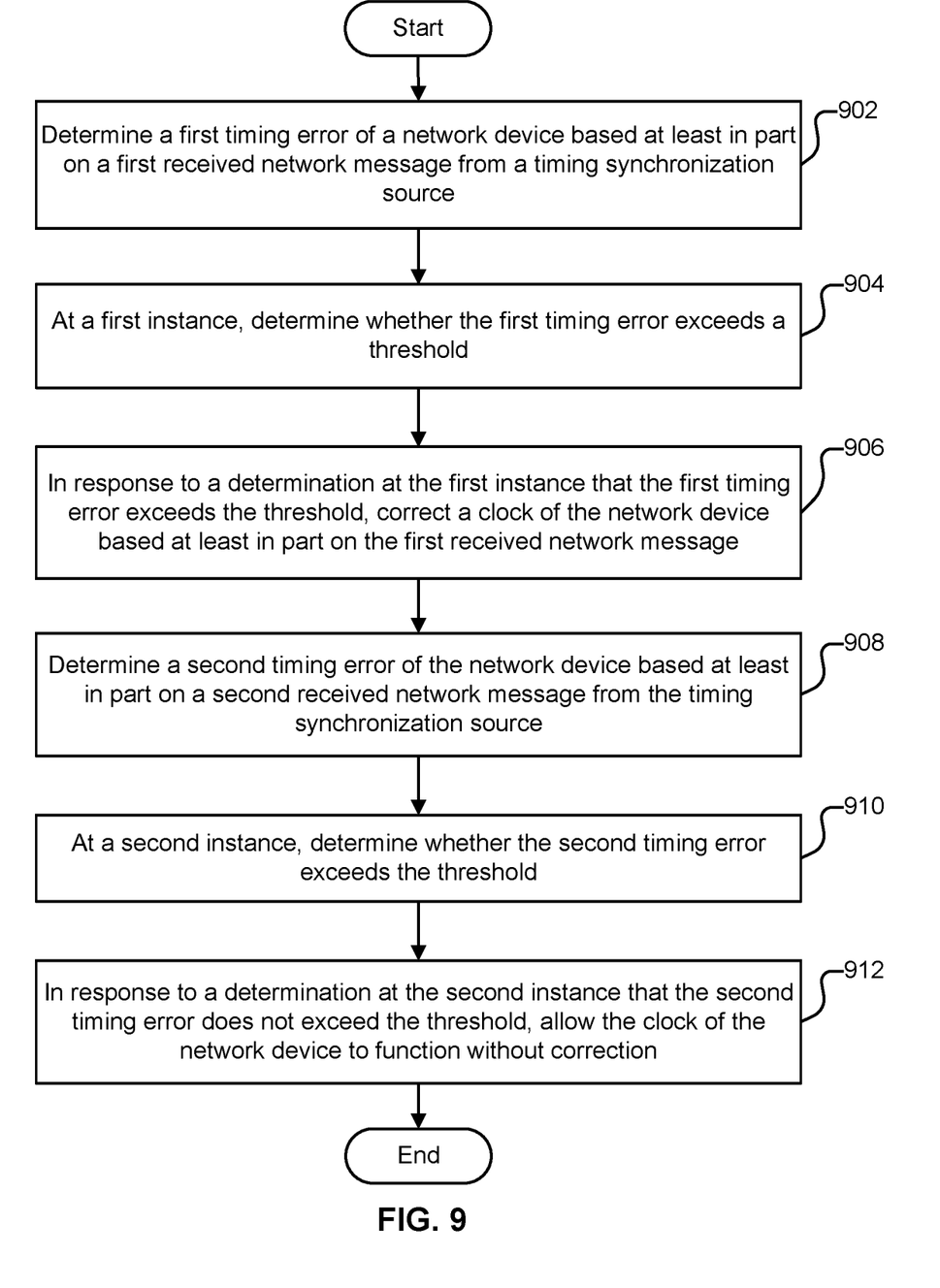
FIG. 9 is a flow chart illustrating an example of two iterations during dynamic correction of a timing error of a clock device.

FIG. 9 is a flow chart illustrating an example of two iterations during dynamic correction of a timing error of a clock device. In some embodiments, the process of FIG. 9 is performed by system 400 of FIG. 4.

At 902, a first timing error of a network device is determined based at least in part on a first received network message from a timing synchronization source. In some embodiments, the network device is network device 402 of FIG. 4. In various embodiments, the timing synchronization source is a network device that is communicatively connected to the network device. In some embodiments, the first received message is part of a set of messages received from the timing synchronization source. In some embodiments, the first received message includes a timestamp. In various embodiments, the first received message is utilized in conjunction with information stored locally by the network device (e.g., one or more local timestamps of the network device) to determine the first timing error. Another timestamp in another message received from the timing synchronization source may also be utilized. In some embodiments, the first timing error of the network device is determined using the process of FIG. 8. In some embodiments, the first timing error of the network device corresponds to a first instance of detecting a timing error, wherein timing errors are determined repeatedly. In some embodiments, the first timing error of the network device is determined as part of the process of FIG. 6.

At 904, at a first instance, it is determined whether the first timing error exceeds a threshold. In some embodiments, the threshold is an upper threshold. Stated alternatively, in some embodiments, 604 of the process of FIG. 6 is evaluated in a first instance to determine whether the first timing error exceeds an upper threshold.

At 906, in response to a determination at the first instance that the first timing error exceeds the threshold, a clock of the network device is corrected based at least in part on the first received message. In some embodiments, the clock of the network device is corrected by performing 606 of the process of FIG. 6. In some embodiments, the clock of the network device is corrected by utilizing servo mechanism 500 of FIG. 5. In some embodiments, correction of the clock of the network device is an iterative process that continues until the clock of the network device has a timing error that falls below a lower threshold. In various embodiments, the times at which the clock of the network device is corrected are stored. For example, the times can be stored in memory associated with programmed computer system 406 of FIG. 4. Based on the stored times, the lengths of time intervals between corrections of the clock of the network device can be calculated. Monitoring the amounts of time between corrections is advantageous because it provides quantitative information about the stability of the clock of the network device.

At 908, a second timing error of the network device is determined based at least in part on a second received network message from the timing synchronization source. In some embodiments, the second received message is part of a set of messages received from the timing synchronization source. In some embodiments, the second received message includes a timestamp. In various embodiments, the second received message is utilized in conjunction with information stored locally by the network device (e.g., one or more local timestamps of the network device) to determine the second timing error. Another timestamp in another message received from the timing synchronization source may also be utilized. In some embodiments, the second timing error of the network device is determined using the process of FIG. 8. In some embodiments, the second timing error of the network device corresponds to a second instance of detecting a timing error, wherein timing errors are determined repeatedly. In some embodiments, the second timing error of the network device is determined as part of the process of FIG. 6. In various embodiments, determining the second timing error of the network device utilizes the same mechanism as determining the first timing error of the network device. The second timing error is determined at a different time than the first timing error. Consequently, the value of the second timing error can be, and often is, different from the value of the first timing error. For example, the second timing error may a value below the threshold triggering correction of the clock of the network device. This may be at a time after the clock of the network device was corrected and before the clock's error has increased beyond the threshold.

At 910, at a second instance, it is determined whether the second timing error exceeds the threshold. Stated alternatively, in some embodiments, 604 of the process of FIG. 6 is evaluated in a second instance to determine whether the second timing error exceeds the upper threshold. The second instance occurs at a different point in time than the first instance.

At 912, in response to a determination at the second instance that the second timing error does not exceed the threshold, the clock of the network device is allowed to function without correction. In various embodiments, subsequent timing errors of the network device will be determined. In various embodiments, if a subsequent timing error of the network device exceeds the threshold, the clock of the network device will be corrected again.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining a first timing error of a network device based at least in part on a first received network message from a timing synchronization source;
   at a first instance, determining whether the first timing error exceeds a threshold;
   in response to a determination at the first instance that the first timing error exceeds the threshold, correcting a clock of the network device based at least in part on the first received network message, wherein correcting the clock of the network device includes determining whether an updated timing error of the clock of the network device is below a lower threshold;
   determining a second timing error of the network device based at least in part on a second received network message from the timing synchronization source;
   at a second instance, determining whether the second timing error exceeds the threshold; and
   in response to a determination at the second instance that the second timing error does not exceed the threshold, allowing the clock of the network device to function without correction.

2. The method of claim 1, wherein the first timing error of the network device is a timing offset of the network device with respect to the timing synchronization source.

3. The method of claim 1, wherein the network device is a network interface controller.

4. The method of claim 1, wherein the first received network message from the timing synchronization source includes a hardware timestamp associated with a network synchronization protocol.

5. The method of claim 4, wherein the network synchronization protocol is precision time protocol.

6. The method of claim 1, wherein the timing synchronization source is another network device comprising a grandmaster clock or another clock to which the clock of the network device is to be aligned.

7. The method of claim 1, wherein the network device and the timing synchronization source are communicatively connected through a local area network.

8. The method of claim 1, wherein determining the first timing error includes calculating a network-device-to-timing-synchronization-source transit delay and a timing-synchronization-source-to-network-device transit delay based at least in part on information in the first received network message and information stored locally at the network device.

9. The method of claim 8, further comprising averaging the network-device-to-timing-synchronization-source transit delay and the timing-synchronization-source-to-network-device transit delay to determine an average delay.

10. The method of claim 1, wherein the clock of the network device is a physical hardware clock.

11. The method of claim 1, wherein correcting the clock of the network device further includes utilizing a programmed computer system to iteratively reduce a difference value associated with the clock of the network device and a clock of the timing synchronization source.

12. The method of claim 1, wherein correcting the clock of the network device further includes calculating a first value proportional to the first timing error, calculating a second value proportional to an integration of past timing errors associated with the first timing error, calculating a sum of the first value and the second value, and transmitting an instruction to adjust a property of the clock of the network device based at least in part on the calculated sum.

13. The method of claim 12, wherein the property of the clock of the network device is an oscillation frequency.

14. The method of claim 1, wherein correcting the clock of the network device further includes terminating a correction mechanism associated with correcting the clock of the network device in response to a determination that the updated timing error of the clock of the network device is below the lower threshold.

15. The method of claim 1, wherein the second timing error is determined at a point in time after the first timing error is determined and also after timing error correction associated with the first timing error has been initiated.

16. The method of claim 1, further comprising storing in a memory a time associated with when correction of the first timing error occurs.

17. The method of claim 1, further comprising determining a third timing error of the network device based at least in part on a third received network message from the timing synchronization source, at a third instance, determining whether the third timing error exceeds the threshold, in response to a determination at the third instance that the third timing error exceeds the threshold, correcting the clock of the network device based at least in part on the third received network message, storing time values associated with correcting the clock of the network device at the first instance and at the third instance in a memory, and calculating and storing in the memory a value corresponding to a time interval between the first instance and third instance.

18. A system, comprising:
one or more processors configured to:
determine a first timing error of a network device based at least in part on a first received network message from a timing synchronization source;
at a first instance, determine whether the first timing error exceeds a threshold;
in response to a determination at the first instance that the first timing error exceeds the threshold, correct a clock of the network device based at least in part on the first received network message, wherein the one or more processors are configured to correct the clock of the network device including by being configured to determine whether an updated timing error of the clock of the network device is below a lower threshold;
determine a second timing error of the network device based at least in part on a second received network message from the timing synchronization source;
at a second instance, determine whether the second timing error exceeds the threshold; and
in response to a determination at the second instance that the second timing error does not exceed the threshold, allow the clock of the network device to function without correction; and
a memory coupled to at least one of the one or more processors and configured to provide at least one of the one or more processors with instructions.

19. A non-transitory computer readable medium embodying a computer program product comprising computer instructions for:
determining a first timing error of a network device based at least in part on a first received network message from a timing synchronization source;
at a first instance, determining whether the first timing error exceeds a threshold;
in response to a determination at the first instance that the first timing error exceeds the threshold, correcting a clock of the network device based at least in part on the first received network message, wherein correcting the clock of the network device includes determining whether an updated timing error of the clock of the network device is below a lower threshold;
determining a second timing error of the network device based at least in part on a second received network message from the timing synchronization source;
at a second instance, determining whether the second timing error exceeds the threshold; and
in response to a determination at the second instance that the second timing error does not exceed the threshold, allowing the clock of the network device to function without correction.

20. The non-transitory computer readable medium of claim 19, wherein the first timing error of the network device is a timing offset of the network device with respect to the timing synchronization source.

* * * * *